United States Patent Office 3,250,740
Patented May 10, 1966

3,250,740
SELECTED COMPOUNDS CONTAINING CARBONYL GROUPS AND ALIPHATIC UNSATURATION AS ANTI-RADS
Herbert R. Anderson, Jr., Bartlesville, Okla., assignor to Phillips Petroleum Company, a corporation of Delaware
No Drawing. Filed June 16, 1960, Ser. No. 36,480
5 Claims. (Cl. 260—45.85)

This invention relates to rubber products resistant to radiation damage.

The word "rubber" as used herein includes both natural and synthetic rubbery materials.

Rubber vulcanizates, when subjected to ionizing radiation, undergo deterioration in stress-strain properties, this being due to chain scission and cross linking. For instance, when some vulcanizates are subjected to radiation, such as alpha rays, beta rays, gamma rays, or neutrons, there is a considerable increase in the modulus of the product, and the number of network chains, related to cross links, is increased. Other vulcanizates, when subjected to the same radiation, are degraded to softer and even liquid products. Such changes are undesirable in either case because the physical properties of the rubber are harmed by this radiation.

Some research has been done to determine what additives can be incorporated in the rubber to produce products which are resistant to radiation or at least more resistant than the material without the use of such additives. These additives are referred to as radiation damage inhibitors or anti-rads. I have discovered a group of compounds which are very effective in reducing this deterioration or radiation damage. Broadly speaking, these organic compounds contain carbonyl groups and have aliphatic unsaturation. Thus, my invention resides in a method comprising incorporating in rubber certain organic compounds, all defined further hereinafter, to render said rubber resistant to radiation damage.

An object of my invention is to provide rubber vulcanizates which are resistant to radiation damage. A further object of my invention is to provide compositions containing certain additives which make the product exhibit less change in modulus than the same product without the additive. A further object of this invention is to provide a method of reducing damage to rubber when subjected to ionizing radiation.

Other objects and advantages of my invention will become apparent to one skilled in the art upon reading the disclosure, and appended claims.

Thus, according to my invention, there is provided a method comprising incorporating in rubber, during the compounding thereof, a compound having the formulas

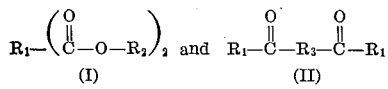

Wherein: each $R_1$ is selected from the group consisting of aromatic and substituted aromatic nuclei containing from 6 to 20 carbon atoms; each $R_2$ is an alkenyl radical containing from 2 to 6 carbon atoms; and $R_3$ is an alkenylene radical containing from 2 to 6 carbon atoms.

Further, according to the invention, there is provided a method of inhibiting a rubber from damage which is caused by exposure to ionizing radiation which method comprises incorporating into said rubber, as a radiation damage inhibitor, at least one of the above-identified organic compounds represented by Formulas I and II.

In the above Formulas I and II, the aromatic nuclei can contain as substituents such radicals as alkyl, amino, carboxy, and acyl. However, nitro and halogen substituents are to be avoided, as these groups promote damage due to ionizing radiation. The term "aromatic nuclei" is intended to include the benzene nucleus, the naphthalene nucleus, and the biphenyl nucleus. Larger aromatic nuclei such as anthracene and phenanthrene are not to be included, since such large rings are not as effective in preventing the deterioration caused by ionizing radiation. Thus, with a 20 carbon upper limit on the substituted aromatic nuclei, the aromatic nuclei can contain from 8 to 14 carbon atoms in substituent groups.

Examples of the selected organic compounds containing carbonyl groups and having aliphatic unsaturation, which can be used in the practice of this invention include, among others:

diallyl phthalate,
divinyl-3-n-butylbenzene-1,2-dicarboxylate,
di(3-butenyl)-5-aminonaphthalene-1,2-dicarboxylate,
di(4-hexenyl) 4-amino-5,6-di-n-pentylnaphthalene-1,3-dicarboxylate,
diallyl 3-phenylbenzene-1,2-dicarboxylate,
di(2-butenyl) 4-acetylbenzene-1,2-dicarboxylate,
diallyl 5-carboxyl-6-acetylbenzene-1,4-dicarboxylate,
trans-1,4-diphenyl-2-butene-1,4-dione,
cis-1,4-dinaphthyl-2-butene-1,4-dione,
cis-1,5-di(3-aminophenyl)-2-pentene-1,5-dione,
trans-1,6-di(4-p-tolylphenyl)-3-hexene-1,6-dione,
cis-1,4-di(3-amino-4-tetradecylphenyl)-2-butene-1,4-dione, and
trans-1,6-di(5-amino-6-sec-decylnaphthyl)-2-octene-1,8-dione.

The amount of any radiation inhibitor employed in the practice of the invention will generally be within the range of from 2 to 10 parts by weight per 100 parts by weight of rubber. A preferred range is 4 to 7 parts by weight per 100 parts by weight of rubber. While an amount in excess of 10 parts is seldom necessary, it is within the scope of the invention to increase the amount of additive as desired.

The invention is applicable to all types of rubber, both natural or synthetic. The synthetic polymers include the groups prepared by polymerizing a conjugated diene of 4 to 10 carbon atoms, either alone, or in combination with an unsaturated comonomer such as styrene, acrylonitrile, methacrylonitrile, methyl vinyl ether, methylmethacrylate, vinyl-substituted pyridines and the like. Generally, the conjugated diene, such as butadiene, isoprene, hexadiene, etc., comprises a major amount of the monomer system. The invention is also applicable to polychloroprene and rubbers of the polyurethane and isocyanate types. For a more complete discussion of the various synthetic rubbers, attention is directed to Whitby, "Synthetic Rubber," published by John Wiley and Sons, Incorporated, New York, N.Y., 1954.

In addition to the radiation damage inhibitors of this invention, the rubber can be compounded with other ingredients such as reinforcing agents, fillers, pigments, vulcanization agents and accelerators, antioxidants and the like. Such ingredients are well known and include, for example, those described in "Synthetic Rubber," Whitby, John Wiley and Sons, Incorporated, New York, N.Y. (1954).

The radiation damage inhibitors of this invention are particularly useful in protecting vulcanized rubber against damage due to ionizing radiation, such as gamma rays and the like. Curing of the compounded rubbers, including both the synthetic and natural types, is generally effected by heating to a temperature in the range between 200 and 400° F. for from 10 minutes to 3 hours.

Total doses of ionizing radiation of from $1 \times 10^5$ to $5 \times 10^8$, and even higher, roentgens equivalent physical, can be tolerated by the protected rubbers of this invention, depending on the amount of radiation damage inhibitor employed and the degree of protection desired.

The following example sets forth specific compositions made according to the present invention, but obviously considerable variation is possible from the specific amounts set forth in the examples. In said examples, the resistance to radiation damage imparted by a given additive is measured by comparing the change in 100% modulus which occur in samples with and without the additive.

EXAMPLE I

A 75/25 butadiene/styrene rubber was prepared by emulsion polymerization at 41° F. to give a polymer having a low Mooney value (ML–4 at 212° F.) of 52 and a bound styrene content of 23 percent. A recipe for the production of such a polymer is:

*Polymerization recipe*

Ingredient: Parts by weight
- 1,3-butadiene _____ 75
- Styrene _____ 25
- Water _____ 180
- Rosin soap, K salt _____ 4.5
- Tamol N* _____ 0.15
- $Na_3PO_4 \cdot 12H_2O$ _____ 0.80
- p-Menthane hydroperoxide _____ 0.12
- $FeSO_4 \cdot 7H_2O$ _____ 0.20
- $K_4P_2O_7$ _____ 0.30
- Tert-dodecyl mercaptan—as required for a 52 ML–4 polymer.

*Sodium salt of a naphthalene sulfonic acid condensed with formaldehyde.

The above-prepared rubber was compounded with the desired radiation damage inhibitor, and a control was run which contained no inhibitor. The compounding recipe employed was as follows:

*Compounding recipe*

Ingredient: Parts by weight
- Butadiene/styrene rubber _____ 100
- Carbon black [1] _____ 50
- Zinc oxide _____ 3
- Stearic acid _____ 1
- Antioxidant [2] _____ 1
- Sulfur _____ 1.75
- Vulcanization accelerator [3] _____ 1
- Radiation damage inhibitor _____ 5

[1] Philblack O, high abrasion furnace black.
[2] A physical mixture containing 65 weight percent of a complex diarylamine-ketone reaction product and 35 percent by weight of N,N'-diphenyl-p-phenylenediamine.
[3] N-cyclohexyl-2-benzothiazylsulfenamide.

The stocks were roll milled, sheeted off the mill, and cured for a finite length of time at 307° F. Variations in cure time were employed to achieve essentially the same 100 percent modulus. Tensile specimens ⅛″ wide and 2″ long (length of test portion) were cut from the sheets which were 25–30 mils in thickness. The specimens were packed into aluminum cans which were closed, purged with helium, and irradiated in a field of gamma rays from spent fuel elements from the Materials Testing Reactor at Arco, Idaho, at a canal temperature of approximately 75° F. A pressure of 25 pounds helium was maintained in the cans during irradiation. Runs were made with total dosages of 0.5 and $1 \times 10^3$ roentgens. One sheet of samples was not irradiated but was reserved for control purposes. The irradiated materials were removed from the gamma ray field and physical properties were determined. The results of these tests are expressed as Table I.

TABLE I

| Anti-rad employed | Parts of anti-rad per 100 parts rubber | Cure time at 307° F., minutes | Radiation dosage (megarep.) | 100% modulus (p.s.i.) | Tensile strength (p.s.i.) | Elongation (percent) |
|---|---|---|---|---|---|---|
| None | 0 | 45 | 0 | 360 | 3,550 | 510 |
| None | 0 | 45 | 50 | 1,120 | 3,330 | 220 |
| None | 0 | 45 | 100 | 1,960 | 3,200 | 150 |
| trans-1,4-diphenyl-2-butene-1,4-dione | 5 | 300 | 0 | 310 | 3,400 | 630 |
| trans-1,4-diphenyl-2-butene-1,4-dione | 5 | 300 | 50 | 860 | 3,370 | 290 |
| trans-1,4-diphenyl-2-butene-1,4-dione | 5 | 300 | 100 | 1,540 | 3,210 | 180 |
| Diallyl phthalate | 5 | 45 | 0 | 300 | 3,280 | 560 |
| Do | 5 | 45 | 50 | 910 | 3,160 | 250 |
| Do | 5 | 45 | 100 | 1,450 | 2,860 | 170 |

It is evident from the above tabulated data that the rubber containing the anti-rads of this invention was not crosslinked nearly so much as that rubber which did not contain a radiation damage inhibitor. This is particularly evident in the figures for 100% modules. Crosslinking causes an increase in the modulus, and each of these rubbers had a 100% modulus before radiation of approximately the same value. After irradiation with $1 \times 10^8$ roentgens equivalent physical (100 megarep.) a much higher 100% modulus was shown by the rubber containing no radiation damage inhibitor than either of the inhibitor-containing rubbers. The rubber containing the diallyl phthalate was somewhat superior to the rubber containing the dione, while both were much superior to the control.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A method of making a rubbery polymer selected from the group consisting of conjugated dienes and copolymers of conjugated dienes and vinyl substituted aromatics stable to ionizing radiation which comprises the steps of: (1) incorporating in said rubber during the compounding thereof, as a radiation damage inhibitor, at least one compound selected from the group of compounds having the structural formulas:

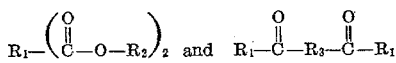

wherein $R_1$ is selected from the group consisting of aromatic and substituted aromatic nuclei containing from 6–20 carbon atoms, said aromatic nuclei being selected from the group consisting of benzene nucleus, naphthalene nucleus and biphenyl nucleus, and the substituents of said substituted aromatic nuclei being selected from the group of radicals consisting of alkyl, amino, carboxy and acyl, $R_2$ is an alkenyl radical containing from 2-6 carbon atoms, and $R_3$ is an alkenylene radical containing from 2-6 carbon atoms; (2) vulcanizing the composition; and (3) thereafter exposing the composition to ionizing radiation of from $1 \times 10^5$ to $5 \times 10^8$ roentgens.

2. The method of claim 1 wherein said radiation damage inhibitor is added in an amount being in the range of 4-7 parts by weight for each 100 parts by weight of said rubber.

3. The method of claim 1 wherein said radiation damage inhibitor is diallyl phthalate.

4. The method of claim 1 wherein said radiation damage inhibitor is trans-1,4-diphenyl-2-butene-1,4-dione.

5. The method of claim 1 wherein the rubber material is a copolymer of butadiene and styrene.

References Cited by the Examiner

UNITED STATES PATENTS

| | | | |
|---|---|---|---|
| 2,380,134 | 7/1945 | Marple | 260—31.8 |
| 2,609,353 | 9/1952 | Rubens et al. | 260—45.4 |
| 2,773,049 | 12/1956 | Cowee | 260—45.85 |
| 2,844,559 | 7/1958 | Parker | 260—45.85 |
| 2,973,309 | 2/1961 | Brodkey et al. | 204—154 |

FOREIGN PATENTS 831,197  3/1960  Great Britain.

OTHER REFERENCES

Institution of the Rubber Industry Transactions, "Depolymerized Rubber-Monomer Compositions," vol. 35, No. 2, pp. 63–72, April 1959.

LEON J. BERCOVITZ, *Primary Examiner.*

ALFONSO D. SULLIVAN, MILTON STERMAN,
*Examiners.*

H. LEVINE, J. W. WILLIAMS, G. W. RAUCHFUSS,
*Assistant Examiners.*